United States Patent [19]

Arai et al.

[11] Patent Number: 4,755,759

[45] Date of Patent: Jul. 5, 1988

[54] TEMPERATURE COMPENSATING METHOD IN AUTOMATIC DIAPHRAGM CONTROL AMPLIFIER USED WITH OBJECTIVE FOR CCTV CAMERA

[75] Inventors: Masayuki Arai; Terumi Ogasawara, both of Tokyo, Japan

[73] Assignee: Asahi Seimitsu Kabushiki Kaisha, Tokyo, Japan

[21] Appl. No.: 913,257

[22] Filed: Sep. 30, 1986

[30] Foreign Application Priority Data

Sep. 30, 1985 [JP] Japan .................. 60-217538

[51] Int. Cl.[4] ........................................ H04N 5/235
[52] U.S. Cl. .................................................. 358/228
[58] Field of Search ........................... 358/228, 209

[56] References Cited

FOREIGN PATENT DOCUMENTS 0064580 4/1985 Japan ..................................... 358/228

Primary Examiner—Michael A. Masinick
Attorney, Agent, or Firm—Birch, Stewart, Kolasch & Birch

[57] ABSTRACT

A temperature compensating method an automatic diaphragm control amplifier used with an objective lens for a CCTV camera lowers or raises an adjusted level of video signal as an ambient temperature rises of lowers, respectively. The temperature compensating means compensates for a temperature-dependent variations in the DC component of the video signal coming from the camera and thereby to prevents the level of video signal from lowering as the ambient temperature rises or lowers.

8 Claims, 2 Drawing Sheets

TEMPERATURE COMPENSATING METHOD IN AUTOMATIC DIAPHRAGM CONTROL AMPLIFIER USED WITH OBJECTIVE FOR CCTV CAMERA

BACKGROUND OF THE INVENTION

Industrial Field of Application

The present invention relates to an automatic diaphragm control amplifier used with an objective for a closed circuit television (CCTV) camera.

Prior Art

In the prior art there has been no means provided for temperature compensation of a video signal level and, even if the level of a video signal actually varied due to a temperature variation, this video signal was usually processed by the built-in circuit arrangement of the camera as if the signal included no such level variation.

Problems to be Solved by Invention

In the camera employing pickup means other than a pickup tube such as a vidicon tube which is able to vary its sensitivity by changing its target voltage, this variation is often used in order to obtain optimal performance of said pickup tube or pickup element, so that a high quality picture of good S/N ratio is obtained for a bright scene and a high sensitivity takes preference over S/N ratio for a dark scene so that the function of the video gain control circuit incorporated in the camera is based on a brightness of the scene. This prior art camera has been inconvenient to use as an adequately bright scene would often result in a low quality picture of inferior S/N, since a level value set by changing the gain of the video amplifier is variable regardless of the brightness. For example, the video signal level may be lowered for the bright scene due to a temperature rise during shooting of this scene, and this signal level may function to increase the video amplifier gain of the camera as if the scene was darkened.

Furthermore, the pickup tube or the solid state pickup element is likely to be accompanied with increased dark current as a temperature rise resulting in that a portion of the picture which should be dark becomes bright. In addition to this tendency, lowering of the signal level due to the temperature rise may affect the function of the automatic diaphragm control amplifier to such an extent that an effective portion of the video signal is reduced and, in an extreme case, there will be no recognizable picture.

SUMMARY OF THE INVENTION

Measures to Solve Problems

Such a circuit arrangement having no means for temperature compensation and exhibiting such a characteristic that a level of video signal is alternated with increasing temperature is indicated by a solid line A in FIG. 4. In this Figure, the characteristic corresponding to a situation in which a scene has been darkened may result, as a temperature rises, even when the scene really remains bright. Such an influence of temperature can be overcome by a compensating element applying a compensation amount, which is more than a variation amount which would occur in the circuit arrangement having no means for temperature compensation, within a range of temperature higher than the normal temperature. This compensation amount may be less than a variation amount which would occur in the circuit arrangement having no means for temperature compensation, within a range of temperature lower than the normal temperature, as indicated by a broken line B in FIG. 4.

Thus, the present invention broadly resides in a temperature compensating method in an automatic diaphragm control amplifier used with an objective lens for CCTV camera, in which an adjusted level of video signal lowers or rises as an ambient temperature rises or lowers, respectively, characterized in that there in provided temperature compensating means adapted to compensate a temperature dependent variation in the DC component of the video signal coming from the camera and thereby to prevent the level of video signal from becoming lower than a value adjusted at the normal temperature as the ambient temperature rises or lowers. More specifically, the present invention resides in a temperature compensating method in an automatic diaphragm control amplifier used with an objective lens for a CCTV camera wherein the automatic diaphragm control amplifier is energized from a single source or double source and when a mid-point voltage (0 or $V_{cc}/2$) is stable, between a ground and a negative source voltage or between the mid-point voltage and ground, a bleeder resistance is provided. The bleeder resistance includes a fixed resistance and thermistor, a resistance value of said fixed resistance being selected to be infinitely small relative to a resistance value of said thermistor, and a voltage thus obtained from said bleeder resistance being applied to an operational amplifier in parallel with the video signal coming from the camera in order to achieve a desired temperature compensation. In an alternative embodiment, the present invention further resides in a temperature compensating method in an automatic diaphragm control amplifier used with an objective lens for a CCTV camera wherein the automatic diaphragm control amplifier is energized from a double source or a single source and when a mid-point voltage (0 or $V_{cc}/2$) is unstable, a bleeder resistance is provided consisting of two fixed resistances of same value connected between the source and a ground, and a thermistor connected between the mid-point voltage and the ground in parallel with the one of said two fixed resistances which is connected to the ground. A voltage thus obtained from said bleeder resistance is applied to an operational amplifier in parallel with the video signal coming from the camera in order to achieve a desired temperature compensation.

Operation

With the automatic diaphragm control amplifier having the characteristic as indicated by the solid line A in FIG. 4, the level of video signal lowers as a temprature rises above the normal temperature, resulting in an exposure as if a scene (i.e., an object to be shot) is darkened and resulting in a corresponding rise in a gain of the pickup tube and the solid state pickup element, so that the lens aperture is enlarged and a picture of inferior S/N ratio is produced. In contrast therewith, according to the temperature compensating method of this invention, the video signal is compensated by an amount smaller than a variation amount occurring at the normal temperature when the ambient temperature is lower than the normal temperature but by an amount larger than a variation amount occurring at the normal temperature when the ambient temperature is higher than the normal temperature. In this manner, the video signal can be compensated so that its level is always maintained higher than a level at the normal temperature and, as a consequence, the automatic diaphragm control amplifier is free from any influence of the temperature.

EMBODIMENTS

Figure 1:
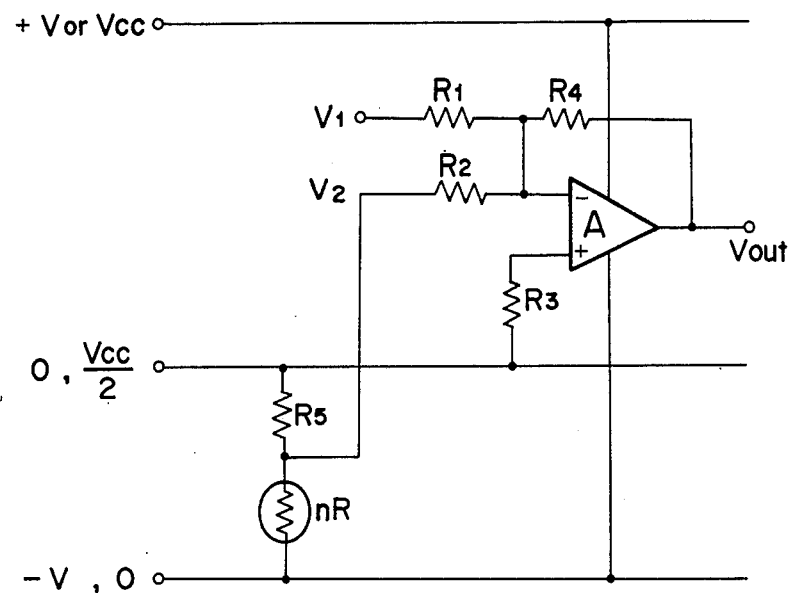
FIG. 1 is a circuit diagram illustrating an important part of an embodiment of the method according to the present invention.

In an embodiment as illustrated by FIG. 1, the circuit is energized from a double source (+V, −V) or single source (Vcc) and a mid-point voltage (0 or Vcc/2) thereof is stable. A video signal V1 coming from the camera is coupled through a resistance R1 to an inverting terminal (−) of an operational amplifier A while the mid-point voltage is input through a resistance R3 to a non-inverting terminal (+). The inverting terminal (−) is connected through a feedback resistance R4 to an output terminal and an output signal Vout is amplified to (R4/R1) V1. The inverting terminal (−) and the non-inverting terminal (+) are in a state of imaginary short-circuit and both of them are at a voltage equal to the mid-point voltage (Vcc/2).

Figure 4:
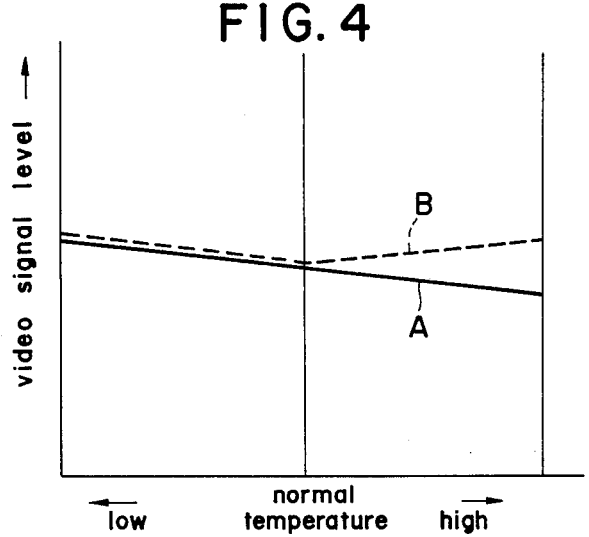
FIG. 4 is a graphic diagram illustrating compensating characteristic curves of the automatic diaphragm control amplifier with respect to the video signal level.

When the ambient temperature rises above the normal temperature and, as a result, the video signal level of the automatic diaphragm control amplifier including the operational amplifier A lowers as indicated by the solid line A in FIG. 4, a rectified portion V1 of the video signal increases in proportion to the temperature rise and the lens aperture is correspondingly reduced with respect to the aperture at the normal temperature so that the gain of the solid state pickup element or like increases.

In view of this, the present invention provides an arrangement such that a fixed resistance R5 is serially connected to a thermistor nR between the mid-point voltage (0 or Vcc/2) and the negative source (−V) or the ground (0), and a signal V2 obtained from a bleeder resistance consisting of said fixed resistance and said thermistor is coupled through a resistance R2 to the inverting terminal (−) of the operational amplifier A in parallel with the video signal V1. A resistance value of said fixed resistance R5 is selected to be infinitely smaller than the resistance value of the thermistor nR.

With such arrangement, it will be obvious from FIG. 3 that the signal V2 lowers below the mid-point voltage (Vcc/2) as the ambient temperature rises above the normal temperature and the resistance value of the thermistor nR correspondingly decreases. Thus, the video signal V1 in parallel with said signal V2 is compensated so as to be correspondingly reduced. The signal V2 infinitely approches the mid-point voltage (Vcc/2) as the ambient temperature lowers below the normal temperature and the resistance value of the thermistor nR correspondingly increases. As a consequence, the video signal level based on the output signal Vout is kept above the level at the normal temperature, as indicated by the broken line in FIG. 4.

A secondary embodiment is given for the case in which the circuit arrangement is energized from double source (+V, −V) or single source (Vcc) and the mid-point voltage is unstable.

Figure 2:
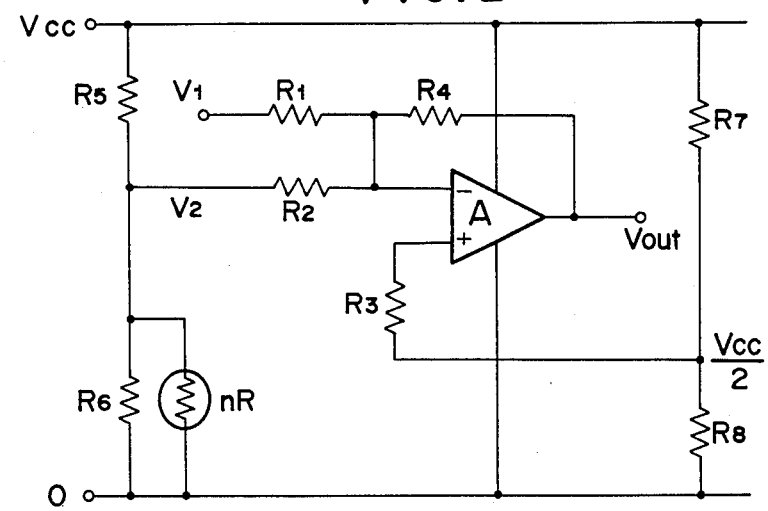
FIG. 2 is a circuit diagram similar to FIG. 1 but concerning another embodiment.

Referring to FIG. 2 illustrating the case of a single source voltage, the non-inverting terminal (+) of the operational amplifier A is applied via the resistance R3 with a mid-point voltage (Vcc/2) across two fixed resistance R7, R8 of same resistance value connected between the source Vcc and the ground 0. This mid-point voltage is unstable and the inverting terminal (−) in synchronization therewith is also unstable. Thus, these terminals are in imaginary short-circuit state. Concerning the signal V2 for temperature compensation, two fixed resistances R5, R6 of same resistance value are connected between the source Vcc and the ground 0 while the thermistor nR is connected in parallel with said fixed resistance R6 on the ground side between the mid-point voltage (Vcc/2) and the ground 0 so that the signal V2 is input from the bleeder resistance consisting of said thermistor nR and said fixed resistance R5 to the inverting terminal (−) of the operational amplifier A via the resistance R3, in parallel with the video signal V1 coming from the camera.

Figure 3:
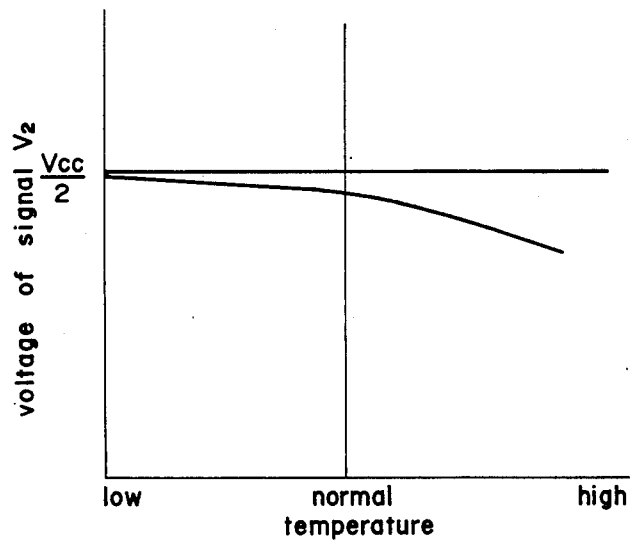
FIG. 3 is a graphic diagram illustrating a characteristic of a compensated signal.

In such a case, the signal V2 for temperature compensation maintains the same relationship with the mid-point voltage (Vcc/2) as the relationship indicated by FIG. 3 as the ambient temperature varies, even though the mid-point voltage is unstable. Thus, there is provided the output signal Vout derived from the video signal which has supplied from the camera and then appropriately compensated.

Effect

With the temperature compensating method according to the present invention, as has been described hereinabove, there is provided the temperature compensating means for the automatic diaphragm control in which the adjusted level of video signal lowers or rises as the ambient temperature rises or lowers, respectively, so that said temperature compensating means compensates for a temperature-dependent variation in DC component of the video signal coming from the camera and thereby prevents the level of video signal from becoming lower than the value adjusted at the normal temperature as the ambient temperature rises or lowers. Accordingly, when the temperature compensating method of the present invention may be employed in the camera utilizing a high sensitivity pickup tube and the solid state pickup element so devised, in order to obtain the optimal performance of said pickup tube or said pickup element, so that a high quality picture of good S/N ratio is obtained for a bright scene and a high sensitivity takes preference over S/N ratio for a dark scene, i.e., the video gain control circuit incorporated in the camera is activated as the scene is darkened, the level of video signal coming from the camera is appropriately compensated so as to prevent this level from lowering and thereby the desired performance of the automatic diaphragm control amplifier is maintained regardless of the temperature variation, even if the level value set to change the gain of the video amplifier is variable independently of the brightness, for example, the video signal level lowers for the bright scene due to the temperature rise during shooting of this scene.

What is claimed is:

1. A method of compensating for variations in video signal gain caused by variations in ambient temperature in an automatic diaphragm control of a video camera comprising:

receiving said video signal;

varying a DC component of said video signal in response to variations in ambient temperature to thereby compensate for temperature-dependent variations in said DC component of said video signal.

2. The method of compensating as set forth in claim 1 wherein said step of varying a D.C. component attenuates said video signal.

3. A method of compensating for variations in video signal gain caused by variations in ambient temperature in an automatic diaphragm control of a video camera comprising:
receiving said video signal;
variably attenuating at least a component of said video signal in response to variations in ambient temperature to thereby compensate for temperature-dependent variations in said video signal.

4. A temperature compensating circuit for an automatic diaphragm control amplifier of a video camera wherein said video signal has a level which varies with variations in ambient temperature comprising:
means for amplifying said video signal; and
temperature compensation means, operatively connected to said means for amplifying, for varying the level of said video signal supplied to said means for amplifying.

5. The temperature compensating circuit of claim 2 further comprising:
a voltage source having first and second source voltages and a stable midpoint voltage level therebetween;
said temperature compensation means including,
a voltage divider including first and second resistances connected between said midpoint voltage and the lower of said first and second source voltage levels, and
a bleeder resistance connected between said means for amplifying and said voltage divider,
said second resistance having a resistance value which varies in relation to ambient temperature to control the amount of attenuation of said video signal occurring through said bleeder resistance.

6. The temperature compensating circuit of claim 5 wherein increased ambient temperature reduces the resistance of said second resistance to increase the attenuation of said video signal.

7. The temperature compensating circuit of claim 4 further comprising:
a voltage source having first and second source voltages and a floating midpoint voltage level therebetween; said temperature compensator means including,
a voltage divider including first and second resistances connected across said first and second source voltages to establish a midpoint voltage,
a bleeder resistance connected between said means for amplifying and said voltage divider,
a third resistance, connected in parallel to said second resistance, having a resistance value which varies in relation to ambient temperature to control the amount of said video signal occurring through said bleeder resistance.

8. The temperature compensating circuit of claim 7 wherein increased ambient temperature reduces the resistance of said third resistance to increase the attenuation of said video signal.

* * * * *